Feb. 15, 1938.　　A. M. SMITH ET AL　　2,108,694
ARTICLE FEEDING DEVICE
Filed Oct. 6, 1936　　2 Sheets-Sheet 1

INVENTORS.
ALEXANDER M. SMITH
BY LAWRENCE H. STRAYER
Kwis, Hudson & Kent,
ATTORNEYS.

Patented Feb. 15, 1938

2,108,694

UNITED STATES PATENT OFFICE 2,108,694

ARTICLE FEEDING DEVICE

Alexander M. Smith and Lawrence H. Strayer, Kent, Ohio, assignors to The Lamson & Sessions Company, Cleveland, Ohio, a corporation of Ohio Application October 6, 1936, Serial No. 104,251

2 Claims. (Cl. 10—167)

This invention relates to article handling apparatus, and more particularly to an improved device for feeding bolt blanks or like articles.

An object of the present invention is to provide an improved article feeding device which is more economical and efficient in operation than the article feeding devices in use heretofore.

Another object of our invention is to provide an improved article feeding device, of the type having a hopper and a conveying means extending therefrom, wherein a plurality of members operable to transfer articles from the hopper to the conveying means are driven in timed relation and with one member substantially counter-balancing the other.

A further object of our invention is to provide an improved device for feeding bolt blanks or like articles wherein a pair of reciprocable elevators are operated to substantially counterbalance each other and to alternately pick up articles in the hopper and deliver the same to a magazine or conveying means disposed above the bottom of the hopper.

Still another object of our invention is to provide an improved article feeding device, of the type mentioned, wherein a pair of members arranged for movement adjacent a conveying means for transferring articles thereto from the hopper have article engaging portions beveled toward the conveying means.

Yet another object of our invention is to provide improved article feeding means, of the type referred to, wherein yieldable operating connections are provided for the movable elevators.

Other objects and advantages of our invention will be apparent from the following description when taken in conjunction with the accompanying sheets of drawings, wherein Fig. 1 is a side elevation, with portions broken away, of an article feeding device embodying our invention.

As we have already indicated, our article feeding device is adapted to handle bolt blanks and like articles, but before proceeding with a detailed description of an embodiment of our device it should be understood that the invention may be embodied in various other forms of machines and may be used for the feeding and handling of numerous different articles.

Figure 2:
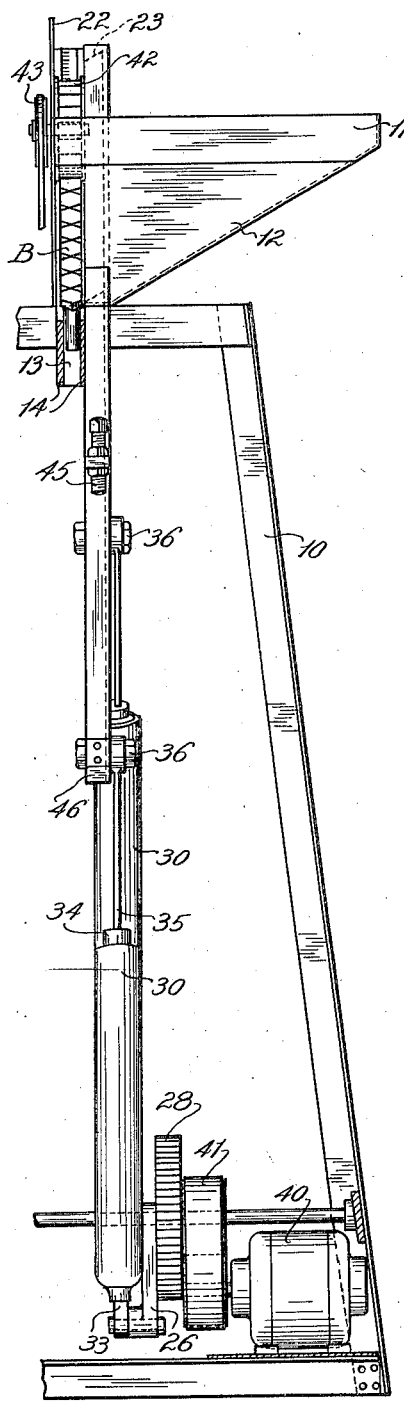
Fig. 2 is a front elevation of the device, but with minor portions thereof shown in section.
Figure 1:
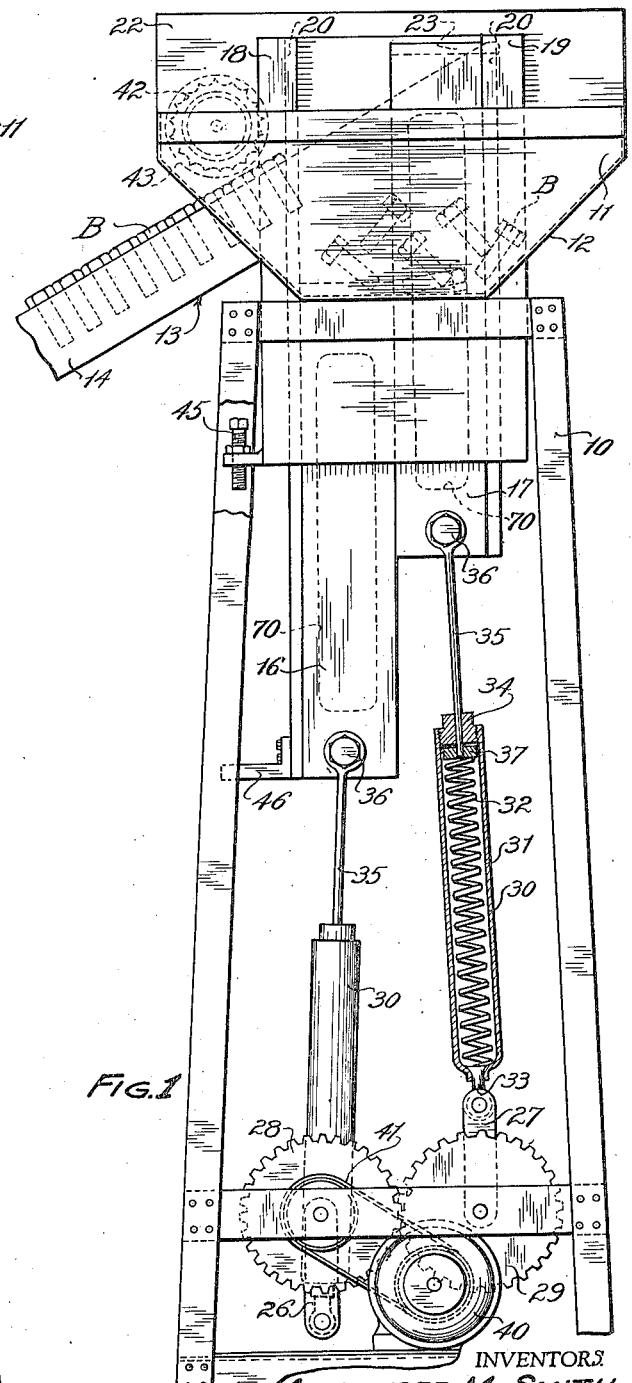
Figure 3:
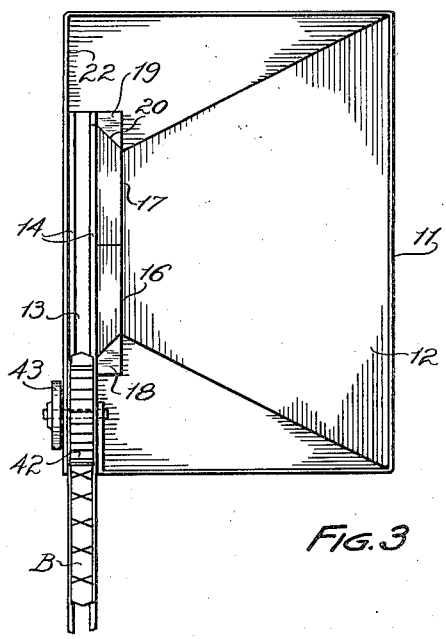
Fig. 3 is a plan view of the device.

In Figs. 1 and 2 we have shown, as one embodiment of our invention, a device for feeding bolt blanks B or like articles, such a feeding device having special utility in connection with various fabricating machines, as for example, machines for threading bolt blanks. Our article feeding device may be provided with a suitable frame 10 which supports a container 11, the latter preferably being in the form of a hopper having a sloping bottom 12 and adapted to contain a supply of the blanks B. An article conveying means in the form of a magazine or galley 13 extends from the hopper and is adapted to support a series of the blanks B in such order that they can be readily fed to the fabricating machine. When the articles are in the form of the bolt blanks B illustrated in this instance, the magazine 13 may comprise a pair of bars 14 spaced apart to freely receive therebetween the stems of the blanks while the heads of the blanks rest upon and slide along the upper edges of the bars. The magazine preferably extends in inclined relation, as shown in Fig. 1, so that the blanks in the upper part of the magazine will move downwardly by gravity as blanks are fed in succession from the lower end.

The upper or article receiving end of the magazine preferably extends into the hopper 11, through an opening in the front wall thereof, so that the articles B can be readily delivered thereto by mechanism to be described next.

The mechanism for delivering the articles to the receiving part of the magazine 13 includes a plurality of reciprocably movable members or elevators 16 and 17 which, in accordance with our invention, operate in timed relation and with one substantially counterbalancing the other. In this instance two elevators only are shown, and both are disposed on the same side of the magazine 13, but elevators in other arrangements and number may be provided, as will be explained later by reference to other views of the drawings. The elevators 16 and 17 are preferably in the form of elongated generally flat blades slidably disposed in a guideway formed by spaced vertically extending gib-like members 18 and 19. The guide members 18 and 19 extend upwardly through the hopper and are disposed immediately adjacent the article receiving end of the magazine so that their beveled guide faces 20 will cooperate with corresponding bevel faces of the elevators 16 and 17 and confine the latter to reciprocating movement with one face thereof substantially in sliding engagement with one of the bars 14 of the magazine.

The article receiving portion of the magazine, which as mentioned above extends into the hopper, is disposed between the elevators and the upstanding back wall 22 of the hopper. During reciprocation of the elevators 16 and 17 their upper ends rise above the article receiving portion of the magazine and, as a feature of our invention, we provide such upper ends with beveled faces 23, as indicated in Fig. 2. These beveled faces form article engaging portions of a shape to cause the articles which are picked up by the elevators to be delivered to the receiving portion of the magazine.

For operating the elevators 16 and 17 we provide suitable mechanism which may be in the form of a pair of cranks 26 and 27 carried by the meshing gear wheels 28 and 29. The cranks 26 and 27 are connected, respectively, with the elevators 16 and 17 by means of yieldable connections 30 each of which may comprise a tubular casing 31 containing a compression spring 32. Each casing has one end thereof connected with one of the cranks by a pivotal connection 33 and, at its opposite end, is provided with a bearing 34 in which a connecting rod 35 is slidable. The upper end of each rod 35 is connected with one of the elevators by a pivotal connection 36 and the lower end carries a seat or plunger 37 which is slidable in the casing 31 and engages the upper end of the spring 32.

The connections between the elevators and the cranks 26 and 27, as just described, are yieldable so that if one of the elevators becomes jammed the cranks will still be able to rotate and the telescoping action permitted between the casing 31 and the rod 35 will prevent breakage. If one of the elevators becomes jammed on its upward stroke the corresponding crank will continue its travel over dead center because the flexibility of the connection 30 will permit this to occur without damage to the apparatus. After the crank has passed dead center the connection 30 will be extended to its full length and thereafter further movement of the crank will cause downward travel of the elevator. In many instances this will result in the jammed elevator being broken loose so that on the succeeding revolution of the crank the elevator will function properly.

It will be noted that the cranks 26 and 27 are disposed 180° apart and that the meshing of the gear wheels 28 and 29 maintains the cranks in this angularly spaced relation. With this arrangement of cranks it will be seen that the elevators 16 and 17 operate in timed relation and that one elevator substantially counterbalances the other. We regard this as an important feature through which important advantages are realized, such as smoother operation, increased speed, and minimum power requirement.

Our feeding device may be operated from any suitable source of power, such as an electric motor 40 mounted on the frame 10. The motor may be connected with one of the gear wheels, for example the wheel 28, by means of a belt drive 41.

In the operation of our feeding device as thus far described the gear wheels 28 and 29 are driven by the motor 40 to thereby cause the elevators 16 and 17 to be reciprocated in timed relation. On its upward stroke each elevator picks up one or more of the blanks B and lifts the same until the bevel face 23 moves past the bar of the magazine 13, whereupon the blanks slide off the beveled face of the elevator onto the article receiving portion of the magazine. Those blanks whose stems enter the opening or groove of the magazine remain thereon, but substantially all of the blanks which do not fall on the magazine in this position drop back into the hopper.

To prevent blanks from traveling down the magazine 13 in improper position we may provide the hopper with a star wheel 42 adjacent the point at which the magazine passes through the wall of the hopper. This star wheel may be driven by a belt 43, in a counterclockwise direction as seen in Fig. 1, and may be provided with a periphery shaped to mesh, so to speak, with the heads of the blanks B so that only blanks arranged in the proper order can move down the magazine past the wheel. Any blanks which travel down the magazine in improper order are kicked from the magazine by the star wheel and fall back into the hopper.

In some instances of use it may be found that our feeding device will supply articles to the magazine 13 at a faster rate than they are needed by the fabricating machine, and in these cases it may be desirable to reduce the rate at which the blanks B are supplied to the magazine. This may be done by providing an adjustable stop 45 and a cooperating lug or finger 46 on one of the elevators, for example the elevator 16. When the capacity of the feeding device is to be reduced the stop 45 is adjusted downwardly to a setting such that its engagement by the lug 46 will prevent the upper end of this elevator from rising above the magazine 13. The result will be that blanks will be supplied to the magazine only by the elevator 17 and the capacity of the device will be reduced approximately 50%.

Our feeding device is shown in this instance as being an independent device or machine having its own frame 10 and which can be moved to any desired station or point of use, but it will be understood, of course, that this device can also be readily embodied in a fabricating machine or other apparatus if this should seem advantageous.

Figure 4:
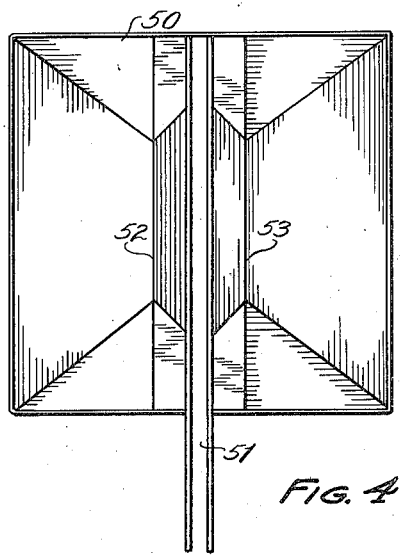
Fig. 4 is a plan view of another article feeding device embodying our invention, but having a different arrangement of elevators.
Figure 5:
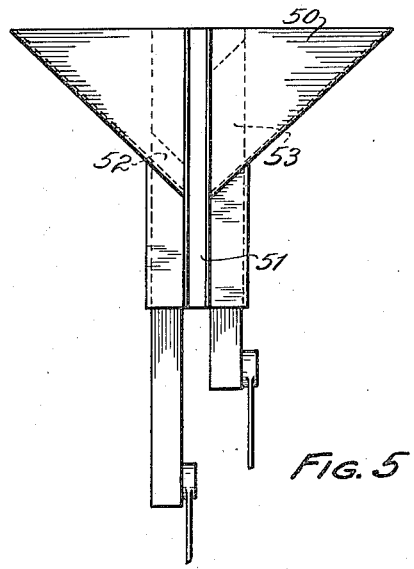
Fig. 5 is a partial front elevation to further illustrate the elevator arrangement of the device of Fig. 4.

In Figs. 4 and 5 of the drawings we have shown our invention embodied in an article feeding device similar to that already described, but wherein the hopper 50 extends on both sides of a magazine 51 and a pair of vertically reciprocable elevators 52 and 53 are also disposed on opposite sides of the elevator.

Figure 6:
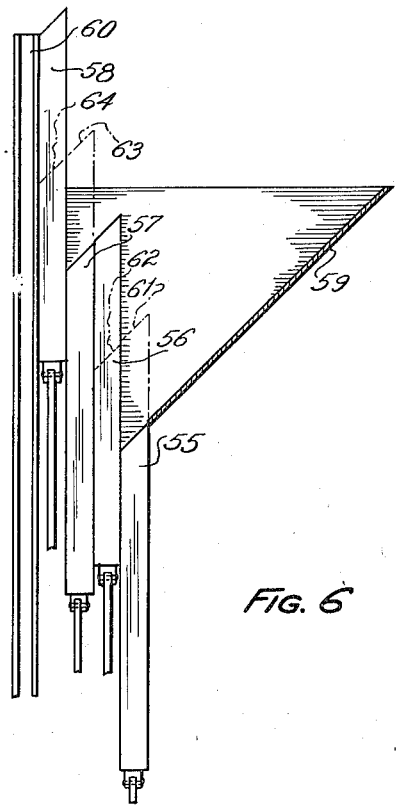
Fig. 6 is a partial sectional elevation illustrating another feeding device of our invention having elevators arranged to provide stage by stage lifting of the articles.

In Fig. 6 of the drawings we have shown another arrangement for the elevators of our feeding device in which four elevators 55, 56, 57 and 58 are employed to obtain a stage by stage lifting of blanks from the hopper 59 to the magazine 60. These elevators are operated in pairs so as to obtain the counterbalanced effect already pointed out in connection with Fig. 1, and during such operation elevators 55 and 57 move upwardly while elevators 56 and 58 move downwardly. The high point of travel of elevator 55 is indicated by the broken line 61, and the low point of travel of the adjacent elevator 56 is indicated by the broken line 62. Similarly, the high and low points of travel for the elevators 57 and 58 are indicated, respectively, by the broken lines 63 and 64. When the elevators are in the full line position shown in Fig. 6, the elevator 55 is about to pick up blanks at the bottom of the hopper, while the elevator 56 is in position to transfer its blanks to the elevator 57, and the elevator 58 is in position to discharge its blanks onto the magazine 60. When the elevators are in the positions indicated by the broken lines it will be seen that the elevator 55 is in position to transfer its blanks to the elevator 56 and the elevator 57 is in position to transfer its blanks to the elevator 58.

If desired, the blades forming the elevators may be formed with a recess 70 in the face thereof which is adjacent the magazine as shown in Fig. 1 of the drawings. This recess reduces the weight of the elevators and provides an escape for chips and other foreign matter which may enter the hopper with the supply of blanks.

From the foregoing description and accompanying drawings it will now be readily seen that we have provided an improved form of article feeding device in which members operating to transfer blanks from a hopper to a magazine are driven in timed relation and with one substantially counterbalancing the other. With this arrangement a smoother and quieter functioning is obtained which enables the device to be operated more satisfactorily at higher speeds than has heretofore been feasible. Furthermore, the balanced arrangement of elevators as provided in our improved device materially reduces the amount of power required to feed a given number of blanks. Other important advantages are realized in our improved device, such as a more positive and effective feeding of blanks to the magazine from the hopper, and a reduction in the amount of time usually lost due to jams and breakdowns of the feeding apparatus.

While we have illustrated and described the feeding device of our invention in a somewhat detailed manner, it will be understood, of course, that we do not wish to be limited to the precise constructions and arrangements disclosed, but regard our invention as including such changes and modifications as do not constitute a departure from the spirit of the invention and the scope of the appended claims.

Having thus described our invention, we claim:

1. In article feeding apparatus, a hopper, a conveying means extending therefrom, a pair of reciprocable members operable to deliver articles from the hopper to the conveying means, and means for limiting the stroke of one of said members to render the same ineffective and thereby reduce the rate of feed.

2. In an article feeding machine, a hopper adapted to contain articles to be fed, a conveying means having an article receiving portion in the hopper and relatively elevated above the bottom thereof and an article delivery portion extending from the hopper, a pair of members arranged for substantially vertically reciprocable movement on opposite sides of said article receiving portion and each having the top thereof transversely beveled toward the article receiving portion, a pair of cranks for actuating said members in timed relation and with one member substantially counterbalancing the other, means providing a longitudinally yieldable connection between each member and its crank, and means for limiting the stroke of one of said members to render the same ineffective and thereby reduce the rate of feed.

ALEXANDER M. SMITH.
LAWRENCE H. STRAYER.